(12) United States Patent
Itoh et al.

(10) Patent No.: US 8,249,769 B2
(45) Date of Patent: Aug. 21, 2012

(54) VEHICLE AND CONTROL METHOD THEREOF

(75) Inventors: Takao Itoh, Seto (JP); Koji Yamamoto, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 317 days.

(21) Appl. No.: 12/595,029

(22) PCT Filed: Apr. 22, 2008

(86) PCT No.: PCT/JP2008/057756
§ 371 (c)(1),
(2), (4) Date: Oct. 7, 2009

(87) PCT Pub. No.: WO2008/133247
PCT Pub. Date: Nov. 6, 2008

(65) Prior Publication Data
US 2010/0070123 A1  Mar. 18, 2010

(30) Foreign Application Priority Data

Apr. 24, 2007 (JP) .................................. 2007-114646

(51) Int. Cl.
*G05D 3/00* (2006.01)
(52) U.S. Cl. ................. 701/22; 701/36; 701/53; 701/54; 701/70; 180/65.1; 180/65.28; 180/65.285; 180/65.21; 318/139; 320/112; 320/116; 320/132; 320/156; 320/161; 903/903; 903/905; 903/906; 903/907; 903/917
(58) Field of Classification Search ............ 701/22, 701/36, 53, 54, 70; 180/65.1, 65.28, 65.285, 180/65.21; 318/139; 320/112, 116, 132, 320/156, 149, 153; 903/903, 905, 906, 907, 903/917, 930
See application file for complete search history.

(56) References Cited

U.S. PATENT DOCUMENTS

| | | | | |
|---|---|---|---|---|
| 5,839,530 A | * | 11/1998 | Dietzel | 180/65.245 |
| 6,615,772 B2 | * | 9/2003 | Ichinose et al. | 123/41.14 |
| 6,672,415 B1 | * | 1/2004 | Tabata | 180/65.25 |

(Continued)

FOREIGN PATENT DOCUMENTS

DE  199 29 594 A1  1/2000

(Continued)

*Primary Examiner* — Redhwan K Mawari
(74) *Attorney, Agent, or Firm* — Kenyon & Kenyon LLP

(57) ABSTRACT

In a hybrid vehicle equipped with an engine, a planetary gear mechanism linked to the output shaft of the engine and to a driveshaft, a first motor linked the planetary gear, a second motor inputting and outputting power to and from the driveshaft, and a battery inputting and outputting electric power to and from the motors, when the battery temperature Tb is lower than the preset reference temperature Tbref, drive control prohibits the intermittent operation of the engine and controls the engine and the motors to output the torque demand to the driveshaft with warm-up control of the battery. When the battery temperature Tb is higher than or equal to the preset reference temperature Tbref and the cooling water temperature Tw is higher than or equal to the preset reference temperature Twref, drive control performs the intermittent operation of the engine and controls the engine and the motors to output the torque demand to the driveshaft. When the battery temperature Tb is higher than or equal to the preset reference temperature Tbref and the cooling water temperature Tw is lower than the preset reference temperature Twref, drive control prohibits the operation of the engine and controls the engine and the motors to keep the warm-up control of the battery and to output the torque demand to the driveshaft.

10 Claims, 8 Drawing Sheets

U.S. PATENT DOCUMENTS

| | | | |
|---|---|---|---|
| 2002/0092296 A1* | 7/2002 | Yamazaki et al. | 60/284 |
| 2003/0131806 A1* | 7/2003 | Suzuki et al. | 123/41.14 |
| 2004/0040757 A1* | 3/2004 | Scherg et al. | 180/65.2 |
| 2006/0102149 A1* | 5/2006 | Furusawa et al. | 123/446 |
| 2007/0034425 A1* | 2/2007 | Roessel | 180/65.2 |

FOREIGN PATENT DOCUMENTS

| | | |
|---|---|---|
| DE | 699 13 449 T2 | 10/2004 |
| EP | 0 985 570 B1 | 12/2003 |
| JP | 2000-040532 A | 2/2000 |
| JP | 2000-092614 A | 3/2000 |
| JP | 2003-272712 A | 9/2003 |
| JP | 2004-3460 A | 1/2004 |
| JP | 2004-44469 A | 2/2004 |
| JP | 2004-60526 A | 2/2004 |
| JP | 2004-328905 A | 11/2004 |
| JP | 2005-105950 A | 4/2005 |
| JP | 2005-337173 A | 12/2005 |
| JP | 2006-171028 A | 6/2006 |
| JP | 2007-99165 A | 4/2007 |
| JP | 2007-221886 A | 8/2007 |

* cited by examiner

VEHICLE AND CONTROL METHOD THEREOF

This is a 371 national phase application of PCT/JP2008/057756 filed 22 Apr. 2008, claiming priority to Japanese Patent Application No. JP 2007-114646 filed 24 Apr. 2007, the contents of which are incorporated herein by reference.

TECHNICAL FIELD

The present invention relates to a vehicle including an internal combustion engine, an electric power generating unit that generates electric power with at least part of power from the internal combustion engine, a motor that inputs and outputs power from and to an axle, and an accumulator unit that inputs and outputs electric power from and to the electric power generating unit and the motor, and the control method thereof.

BACKGROUND ART

In a proposed vehicle, an engine, a planetary gear that is connected to an output shaft of the engine and to a drive shaft, a first motor that is connected to the planetary gear, a second motor that is connected to the drive shaft, and a battery that inputs and outputs electric power from and to the first motor and the second motor are provided (see, for example, Patent document 1). In this prior art vehicle, a target charge state is changed when a battery temperature is lower than a preset temperature and the engine and the two motors are controlled so that the battery is charged or discharged at the target charge state, thereby warming up the battery through a forced charge or discharge to adequately enhance a battery performance.

[Patent Document 1] Japanese Patent Laid-Open Gazette No. 2000-92614

DISCLOSURE OF THE INVENTION

An important issue is to enhance the battery performance in order to improve a driving performance of the vehicle and a driving energy regeneration performance. Thus, an appropriate management of the battery is highly required in order to enhance the battery performance as possible.

The vehicle of the invention and the control method thereof thus aim to enhance a performance of the vehicle by an appropriate management of a state of an accumulator unit such as a secondary battery.

At least part of the above and the other related objects is attained by a vehicle and a control method thereof of the invention having the configurations discussed below.

The present invention is directed to a vehicle. The hybrid vehicle includes an internal combustion engine, an electric power generating unit that generates electric power with at least part of power from the internal combustion engine, a motor that inputs and outputs power from and to an axle, an accumulator unit that inputs and outputs electric power from and to the electric power generating unit and the motor, a temperature detector that detects the temperature of the accumulator unit, a driving force demand setting module that sets a driving force demand for driving the vehicle, and a control module that drives the internal combustion engine and controls the internal combustion engine, the electric power generating unit and the motor to ensure output of a driving force equivalent to the set driving force demand and charge and discharge of the accumulator unit for warming up the accumulator unit upon a satisfaction of a specific condition that the detected temperature of the accumulator unit is lower than a first preset reference temperature, the specific condition being one of conditions for prohibiting the intermittent operation of the internal combustion engine, the control module performing the intermittent operation of the internal combustion engine and controlling the internal combustion engine, the electric power generating unit and the motor to ensure output of the driving force equivalent to the set driving force demand on condition that the detected temperature of the accumulator unit is higher than or equal to the first preset reference temperature and the conditions for prohibiting the intermittent operation other than the specific condition are not satisfied, the control module continuing the operation of the internal combustion engine and controlling the internal combustion engine, the electric power generating unit and the motor to ensure output of the driving force equivalent to the set driving force demand and charge and discharge of the accumulator unit for warming up the accumulator unit on condition that the detected temperature of the accumulator unit is higher than or equal to the first preset reference temperature and the conditions for prohibiting the intermittent operation other than the specific condition are satisfied.

The vehicle of the invention drives the internal combustion engine and controls the internal combustion engine, the electric power generating unit and the motor to ensure output of a driving force equivalent to the set driving force demand and charge and discharge of the accumulator unit for warming up the accumulator unit upon a satisfaction of a specific condition that the detected temperature of the accumulator unit is lower than a first preset reference temperature. The specific condition is one of conditions for prohibiting the intermittent operation of the internal combustion engine. The control module performs the intermittent operation of the internal combustion engine and controls the internal combustion engine, the electric power generating unit and the motor to ensure output of the driving force equivalent to the set driving force demand on condition that the detected temperature of the accumulator unit is higher than or equal to the first preset reference temperature and the conditions for prohibiting the intermittent operation other than the specific condition are not satisfied. The control module continues the operation of the internal combustion engine and controls the internal combustion engine, the electric power generating unit and the motor to ensure output of the driving force equivalent to the set driving force demand and charge and discharge of the accumulator unit for warming up the accumulator unit on condition that the detected temperature of the accumulator unit is higher than or equal to the first preset reference temperature and the conditions for prohibiting the intermittent operation other than the specific condition are satisfied. Namely, when the temperature of the accumulator unit is lower than the first preset temperature, that is, the specific condition as one of conditions for prohibiting the intermittent operation is satisfied, the warm-up of the accumulator unit is enhanced by charge and discharge of the accumulator unit. Further, the intermittent operation of the internal combustion engine is performed when the temperature of the accumulator unit is higher than or equal to the first preset temperature and the conditions for prohibiting the intermittent operation other than the specific condition are not satisfied. When the conditions for prohibiting the intermittent operation other than the specific condition are satisfied, the vehicle of the invention continues the intermittent operation of the internal combustion engine and charge and discharge of the accumulator unit for warm-up. Thus, on condition that the intermittent operation of the internal combustion engine is performable, this control improves the performance of the vehicle by the intermittent operation. Further, on condition that the intermittent operation of the internal combustion engine is not performable, this control improves the performance of the vehicle by enhancing the performance of the accumulator unit.

In the vehicle of the invention, the control module may continue the operation of the internal combustion engine and control the internal combustion engine, the electric power generating unit and the motor to ensure output of the driving force equivalent to the set driving force demand on condition that the detected temperature of the accumulator unit is higher than or equal to a second preset reference temperature that is higher than the first preset reference temperature and the conditions for prohibiting the intermittent operation other than the specific condition are satisfied. This arrangement prevents the accumulator unit from being charged and discharged for warm-up unnecessarily. Here, 'the preset second temperature' is, for example, set to be within a temperature at which the accumulator unit is properly controlled.

In the vehicle of the invention, one of the conditions for prohibiting the intermittent operation other than the specific condition may be a condition that a cooling water temperature of the internal combustion engine is lower than a preset water temperature.

In the vehicle of the invention, the control module may set input and output limits of the accumulator unit based on a state of the accumulator unit including the detected temperature of the accumulator unit and control the internal combustion engine, the electric power generating unit and the motor to ensure output of the driving force equivalent to the set driving force demand within a range of the set input and output limits.

In the vehicle of the invention, the electric power generating unit is an electric power-mechanical power input output mechanism that is connected to the driveshaft linked to the axle and to an output shaft of the internal combustion engine to independently rotate with respect to the driveshaft and outputs at least part of power from the internal combustion engine to the driveshaft through input and output of electric power and mechanical power. In this case, the electric power-mechanical power input output mechanism includes a generator that inputs and outputs power, and a three shaft-type power input output assembly that is connected to three shafts, the output shaft of the internal combustion engine, a rotating shaft of the generator, and the driveshaft, the three shaft-type power input output assembly configured to input and output power from and to a residual one shaft based on power input from and output to any two shafts among the three shafts.

The present invention is directed to a control method of a vehicle that includes an internal combustion engine, an electric power generating unit that generates electric power with at least part of power from the internal combustion engine, a motor that inputs and outputs power from and to an axle, and an accumulator unit that inputs and outputs electric power from and to the electric power generating unit and the motor, the control method comprising the steps of: (a) setting a driving power demand for driving the vehicle, and (b) driving the internal combustion engine and controlling the internal combustion engine, the electric power generating unit and the motor to ensure output of a driving force equivalent to the set driving force demand and charge and discharge of the accumulator unit for warming up the accumulator unit upon a satisfaction of a specific condition that the detected temperature of the accumulator unit is lower than a first preset reference temperature, the specific condition being one of conditions for prohibiting the intermittent operation of the internal combustion engine, the step (b) performing the intermittent operation of the internal combustion engine and controlling the internal combustion engine, the electric power generating unit and the motor to ensure output of the driving force equivalent to the set driving force demand on condition that the detected temperature of the accumulator unit is higher than or equal to the first preset reference temperature and the conditions for prohibiting the intermittent operation other than the specific condition are not satisfied, the step (b) continuing the operation of the internal combustion engine and controlling the internal combustion engine, the electric power generating unit and the motor to ensure output of the driving force equivalent to the set driving force demand and charge and discharge of the accumulator unit for warming up the accumulator unit on condition that the detected temperature of the accumulator unit is higher than or equal to the first preset reference temperature and the conditions for prohibiting the intermittent operation other than the specific condition are satisfied.

The control method of the invention drives the internal combustion engine and controls the internal combustion engine, the electric power generating unit and the motor to ensure output of a driving force equivalent to the set driving force demand and charge and discharge of the accumulator unit for warming up the accumulator unit upon a satisfaction of a specific condition that the detected temperature of the accumulator unit is lower than a first preset reference temperature. The specific condition is one of conditions for prohibiting the intermittent operation of the internal combustion engine. The control method performs the intermittent operation of the internal combustion engine and controls the internal combustion engine, the electric power generating unit and the motor to ensure output of the driving force equivalent to the set driving force demand on condition that the detected temperature of the accumulator unit is higher than or equal to the first preset reference temperature and the conditions for prohibiting the intermittent operation other than the specific condition are not satisfied. The control method continues the operation of the internal combustion engine and controls the internal combustion engine, the electric power generating unit and the motor to ensure output of the driving force equivalent to the set driving force demand and charge and discharge of the accumulator unit for warming up the accumulator unit on condition that the detected temperature of the accumulator unit is higher than or equal to the first preset reference temperature and the conditions for prohibiting the intermittent operation other than the specific condition are satisfied. Namely, when the temperature of the accumulator unit is lower than the first preset temperature, that is, the specific condition as one of conditions for prohibiting the intermittent operation is satisfied, the warm-up of the accumulator unit is enhanced by charge and discharge of the accumulator unit. Further, the intermittent operation of the internal combustion engine is performed when the temperature of the accumulator unit is higher than or equal to the first preset temperature and the conditions for prohibiting the intermittent operation other than the specific condition are not satisfied. When the conditions for prohibiting the intermittent operation other than the specific condition are satisfied, the control method of the invention continues the intermittent operation of the internal combustion engine and charge and discharge of the accumulator unit for warm-up. Thus, on condition that the intermittent operation of the internal combustion engine is performable, this control improves the performance of the vehicle by the intermittent operation. Further, on condition that the intermittent operation of the internal combustion engine is not performable, this control improves the performance of the vehicle by enhancing the performance of the accumulator unit.

In the control method of the invention, the step (b) may continue the operation of the internal combustion engine and control the internal combustion engine, the electric power generating unit and the motor to ensure output of the driving force equivalent to the set driving force demand on condition that the detected temperature of the accumulator unit is higher than or equal to a second preset reference temperature that is higher than the first preset reference temperature and the conditions for prohibiting the intermittent operation other than the specific condition are satisfied. This arrangement prevents the accumulator unit from being charged and discharged for warm-up unnecessarily. Here, 'the preset second temperature' is, for example, set to be within a temperature at which the accumulator unit is properly controlled.

In the control method of the invention, one of the conditions for prohibiting the intermittent operation other than the specific condition may be a condition that a cooling water temperature of the internal combustion engine is lower than a preset water temperature.

In the control method of the invention, the step (b) may set input and output limits of the accumulator unit based on a state of the accumulator unit including the detected temperature of the accumulator unit and control the internal combustion engine, the electric power generating unit and the motor to ensure output of the driving force equivalent to the set driving force demand within a range of the set input and output limits.

BEST MODES OF CARRYING OUT THE INVENTION

One mode of carrying out the invention is discussed below as a preferred embodiment.

Figure 1:
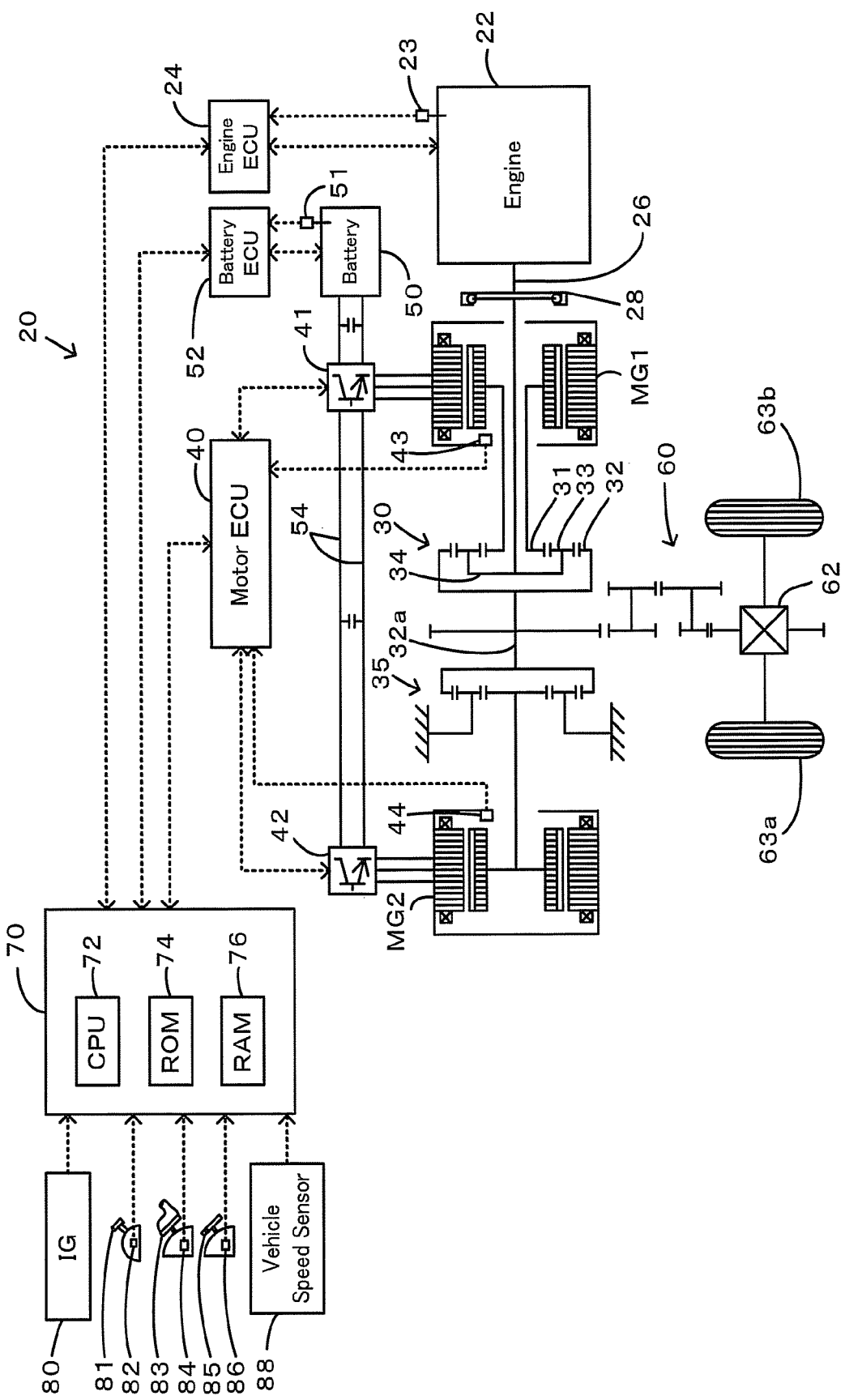
FIG. 1 schematically illustrates the configuration of a hybrid vehicle 20 in one embodiment of the invention.

FIG. 1 schematically illustrates the configuration of a hybrid vehicle 20 in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is connected to the power distribution integration mechanism 30 and has power generation capability, a reduction gear 35 that is attached to a ring gear shaft 32a or a driveshaft connected to the power distribution integration mechanism 30, a motor MG2 that is connected to the reduction gear 35, and a hybrid electronic control unit 70 that controls the operations of the whole hybrid vehicle 20.

The engine 22 is an internal combustion engine that consumes a hydrocarbon fuel, such as gasoline or light oil, to output power. The engine 22 is under control of an engine electronic control unit 24 (hereafter referred to as engine ECU 24). The engine ECU 24 receives signals from various sensors that measure and detect the conditions of the engine 22. For example, the engine ECU 24 inputs a engine cooling water temperature Tw from a cooling water temperature sensor 23 measured as the temperature of cooling water for cooling the engine 22. The engine ECU 24 establishes communication with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60 and the differential gear 62, and the axle from ring gear shaft 32a.

The motors MG1 and MG2 are constructed as known synchronous motor generators that may be actuated both as a generator and as a motor. The motors MG1 and MG2 transmit electric powers to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged, when the input and output of electric powers are balanced between the motors MG1 and MG2. Both the motors MG1 and MG2 are driven and controlled by a motor electronic control unit 40 (hereafter referred to as motor ECU 40). The motor ECU 40 inputs signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to drive and control the motors MG1 and MG2 in response to control signals received from the hybrid electronic control unit 70, while outputting data regarding the driving conditions of the motors MG1 and MG2 to the hybrid electronic control unit 70 according to the requirements.

Figure 2:
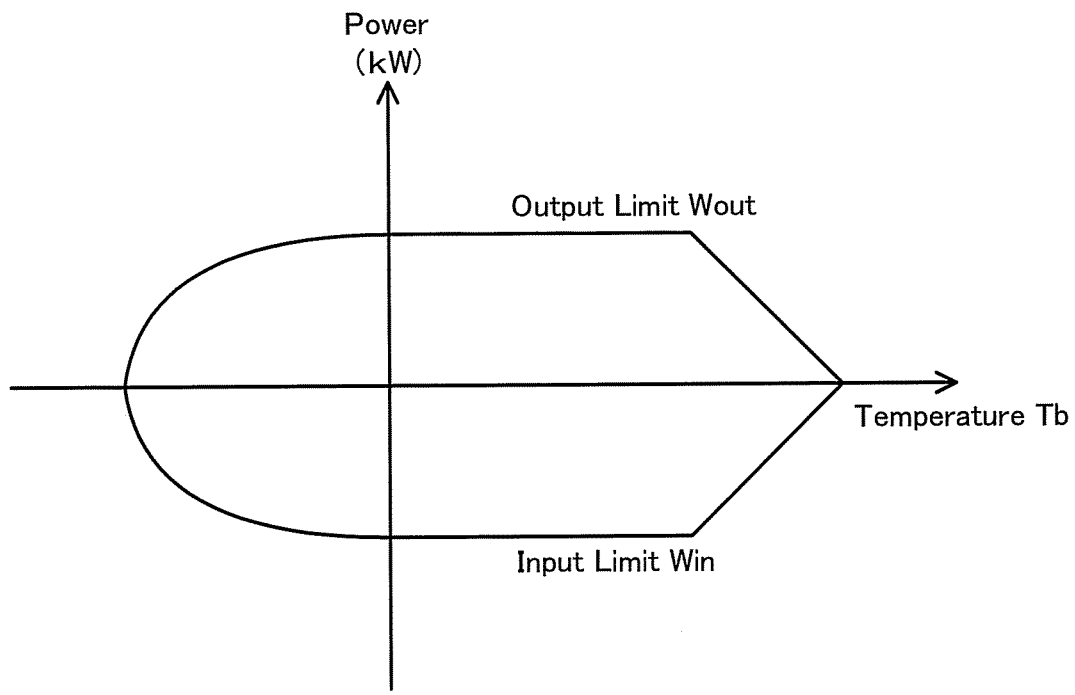
FIG. 2 shows one example of a relationship between a battery temperature Tb of a battery 50 and input and output limits Win and Wout.
Figure 3:
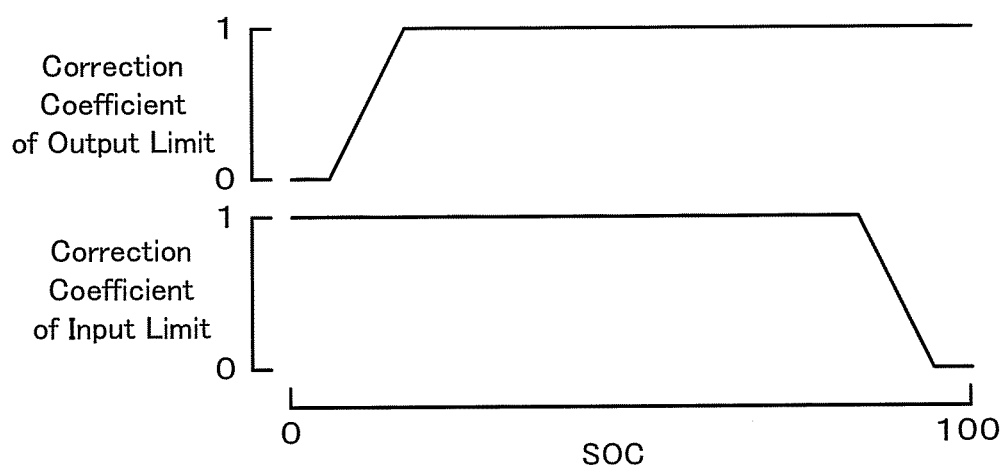
FIG. 3 shows one example of a relationship between the State of Charge (SOC) of the battery 50 and correction coefficients of the input and output limits Win and Wout.

The battery 50 is constructed a secondary battery such as a nickel hydride battery. The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50. The battery ECU 52 calculates input and output limits Win and Wout based on the calculated state of charge (SOC) of the battery 50 and the battery temperature Tb. The input and output limits Win and Wout are maximum allowable charge-discharge electric power of the battery 50. The input and output limits Win and Wout of the battery 50 can be set by setting basic values of the input and output limits Win and Wout based on the battery temperature Tb, setting an output limit correction coefficient and an input limit correction coefficient based on the state of charge (SOC) of the battery 50, and multiplying the set basic values of the input and output limits Win and Wout by the correction coefficients. FIG. 2 shows an example of a relationship between the battery temperature Tb and the input and output limits Win and Wout, and FIG. 3 shows an example of a relationship between the state of charge (SOC) of the battery 50 and the correction coefficients of the input and output limits Win and Wout.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 4:
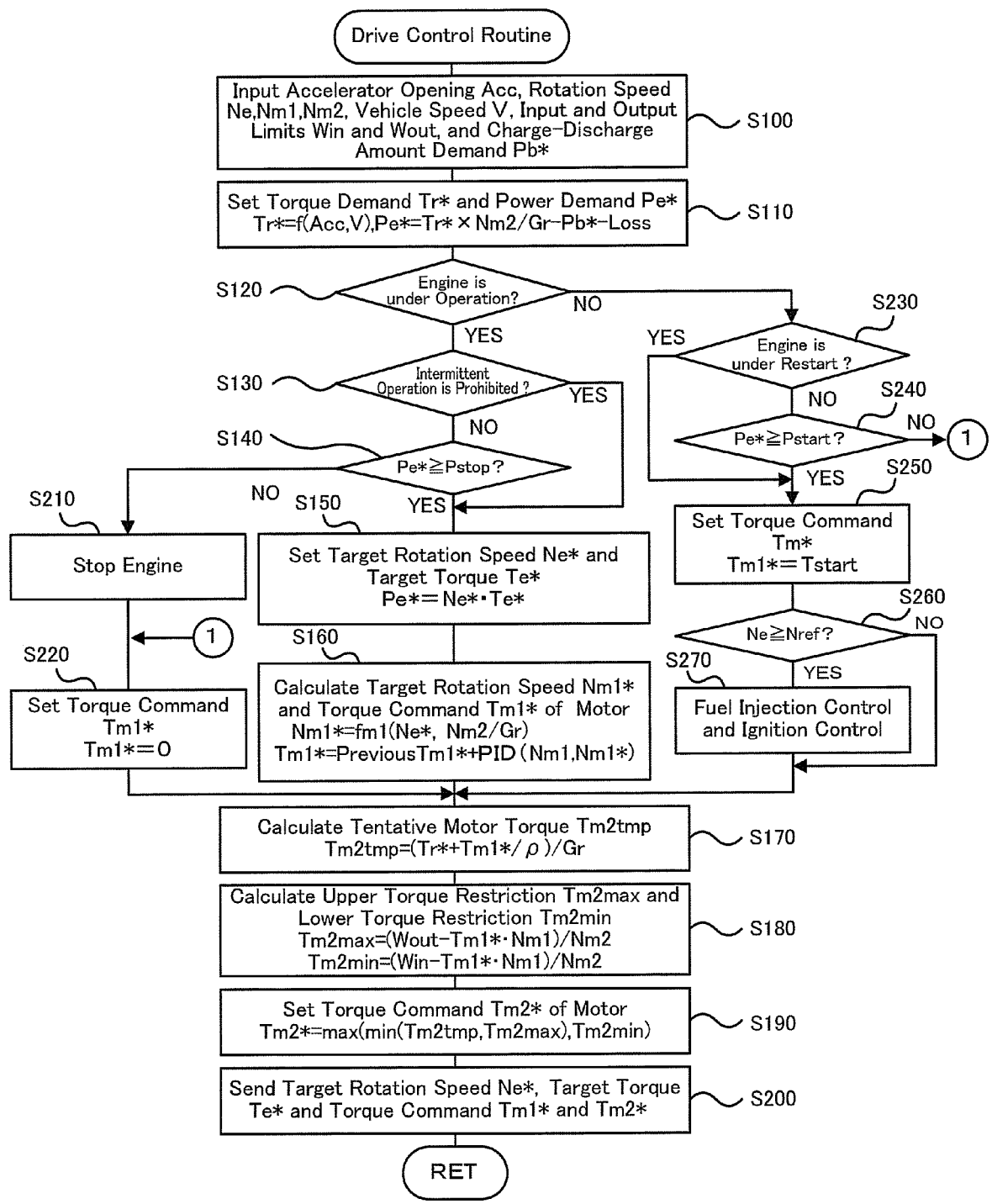
FIG. 4 is a flowchart showing a drive control routine executed by a hybrid electronic control unit 70 included in the hybrid vehicle of the embodiment.

The description regards a series of control operations, especially charge-discharge control of the battery 50, executed in the hybrid vehicle 20 of the embodiment having the configuration discussed above. FIG. 4 is a flowchart showing a drive control routine executed by the hybrid electronic control unit 70. This drive control routine is performed repeatedly at preset time intervals, for example, at every several msec such as 8 msec.

In the drive control routine, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, a rotation speed of the engine 22, input and output limits Win and Wout of the battery 50, and a charge-discharge power demand Pb* to be charged into the battery 50 or to be discharged from the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The rotation speed of the engine 22 is computed from the crank position in the engine 22 detected by a crank position sensor (not shown) and is received from the engine ECU 24 by communication. The input and output limits Win and Wout of the battery 50 are set by the battery ECU 52 and are received from the battery ECU 52 by communication. The charge-discharge power demand Pb* of the battery 50 is set by a charge-discharge power demand setting process (say later) performed by the hybrid electronic control unit 70 and is received.

Figure 5:
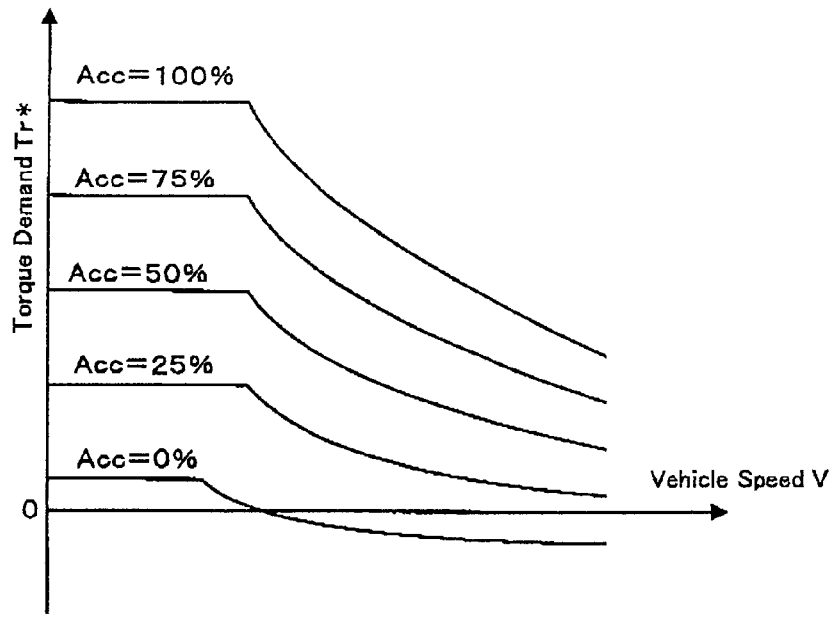
FIG. 5 shows one example of a torque demand setting map.

After the data input, the CPU 72 sets a torque demand Tr* output to the ring gear shaft 32a or the driveshaft connected to the driving wheels 39a and 39b and a power demand Pe* output from the engine 22 based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 5. The power demand Pe* is calculated by subtracting the charge-discharge power demand Pb* of the battery 50 from the product of the torque demand Tr* and a rotation speed Nr of the ring gear shaft 32a, and adding a potential loss. The rotation speed Nr of the ring gear shaft 32a is obtained by dividing the rotation speed Nm2 of the motor MG2 by a gear ratio Gr of the reduction gear 35 or by multiplying the vehicle speed V by a conversion factor k.

Figure 6:
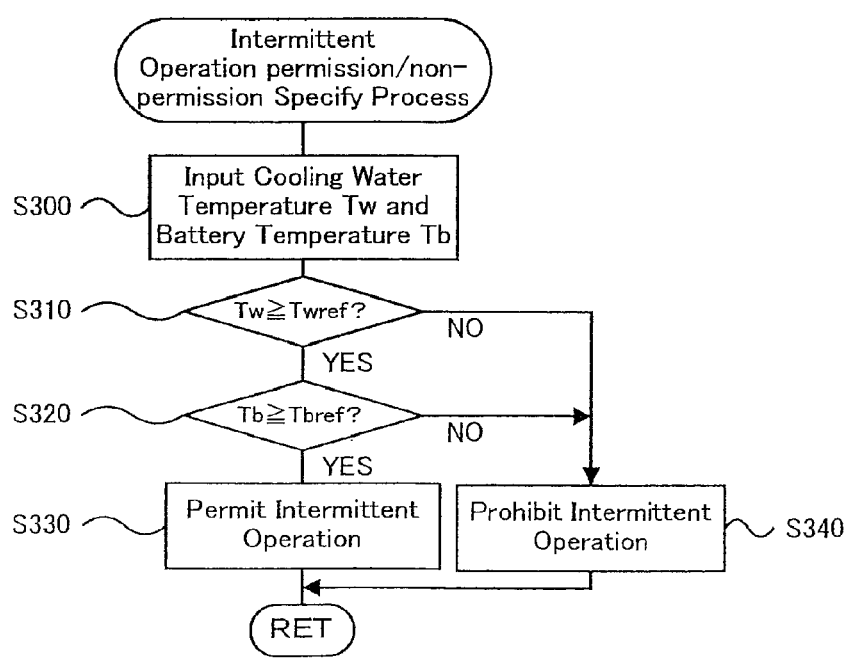
FIG. 6 is a flowchart showing an intermittent operation permission/non-permission specifying process executed by hybrid electronic control unit 70 included in the hybrid vehicle of the embodiment.
Figure 7:
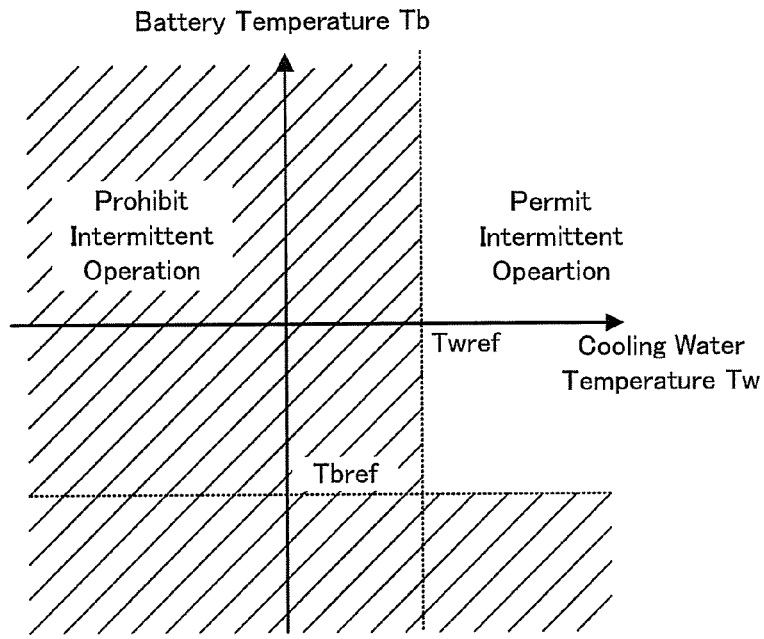
FIG. 7 shows an example of an intermittent operation permission area and an intermittent operation non-permission area specified based on a cooling water temperature Tw and a battery temperature Tb.

The CPU 72 subsequently specifies whether the engine 22 is in operation (step S120). When the engine 22 is in operation, the CPU 72a specifies whether the intermittent operation of the engine 22 is prohibited (step S130). The intermittent operation of the engine 22 is specified by an intermittent operation permission/non-permission specifying process executed by the hybrid electronic control unit 70 as shown in FIG. 6. The process inputs the cooling water temperature Tw of the engine 22 detected by the cooling water temperature sensor 23 and received from the engine ECU 24 by communication and inputs the battery temperature Tb detected by the temperature sensor 51 and received from the battery ECU 52 by communication (step S300). The process specifies whether the input cooling water temperature Tw is higher than or equal to a preset reference temperature Twref (step S310) and specifies whether the input battery temperature Tb is higher than or equal to a preset reference temperature Tbref (step S320). When the cooling water temperature Tw is higher than or equal to the preset temperature Twref and the battery temperature Tb is higher than or equal to the preset temperature Tbref, the process permits the intermittent operation of the engine 22 (step S330) and exits. When the cooling water temperature Tw is lower than the preset reference temperature Twref or the battery temperature Tb is lower than the preset reference temperature Tbref, the process prohibits the intermittent operation of the engine 22 (step S340) and exits. The preset reference temperature Twref is a threshold to specify whether the warm-up of the engine 22 is required and is set according to an engine specification to the temperature level such as 40° C., 45° C., or 50° C. The preset reference temperature Tbref is a threshold to specify whether the warm-up of the battery 50 is required and is set according to a battery specification to the temperature level such as −15° C., −10° C., or −5° C. FIG. 7 shows an example of an intermittent operation permission area and an intermittent operation non-permission area specified based on a cooling water temperature Tw and a battery temperature Tb. When the cooling water temperature Tw is lower than the preset reference temperature Twref, the intermittent operation of the engine 22 is prohibited to warm up the engine 22. When the battery temperature Tb is lower than the preset reference temperature Tbref, the intermittent operation of the engine 22 is prohibited to warm up the battery 50.

On condition that the intermittent operation of the engine 22 is not prohibited, the CPU 72 specifies whether the set power demand Pe* at step S110 is lower than a preset reference power Pstop for stopping the operation of the engine 22 (step S140). The preset reference power Pstop can be set to a value proximity to a minimum power level of the power range where the engine 22 is efficiently operated.

Figure 8:
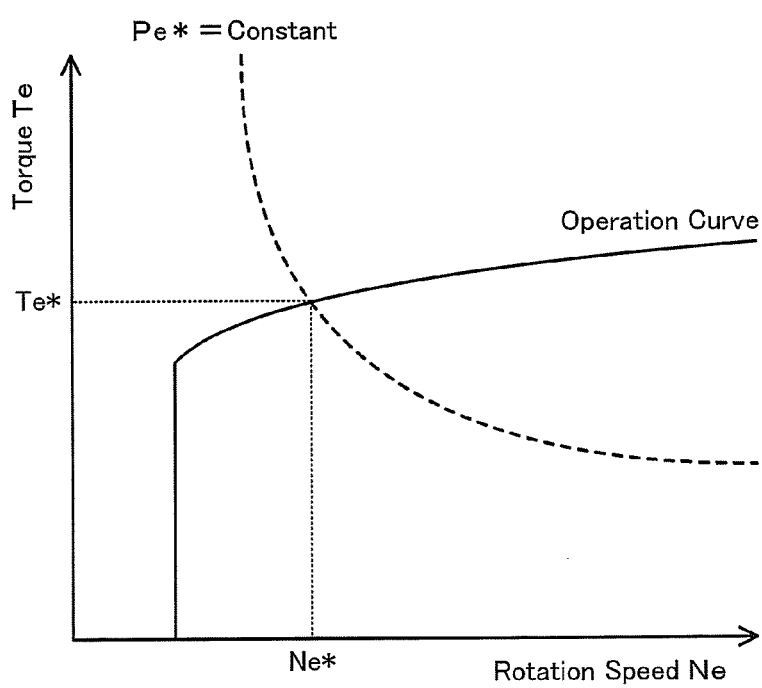
FIG. 8 shows an efficient operation line of an engine to set a target rotation speed Ne* and a target torque Te*.

On condition that the intermittent operation of the engine 22 is prohibited or the power demand Pe* is higher than or equal to the preset reference power Pstop, the CPU 72 determines to keep the operation of the engine 22 and sets a target rotation speed Ne* and a target torque Te* of the engine 22 corresponding to the power demand Pe* (step S150). The target rotation speed Ne* and the target torque Te* of the engine 22 are determined according to an efficient operation curve of ensuring efficient operation of the engine 22 and a curve of the power demand Pe*. FIG. 8 shows an efficient operation curve of the engine 22 to set the target rotation speed Ne* and the target torque Te*. As clearly shown in FIG. 8, the target rotation speed Ne* and the target torque Te* are given as an intersection of the efficient operation curve and a curve of constant power demand Pe* (=Ne*×Te*).

The CPU 72 then calculates a target rotation speed Nm1* of the motor MG1 from the target rotation speed Ne* of the engine 22, the rotation speed Nm2 of the motor MG2, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S160):

$$Nm1^* = Ne^* \cdot (1+\rho)/\rho - Nm2/(Gr \cdot \rho) \quad (1)$$

$$Tm1^* = \rho \cdot Te^*/(1+\rho) + k1(Nm1^* - Nm1) + k2\int(Nm1^* - Nm1)dt \quad (2)$$

Figure 9:
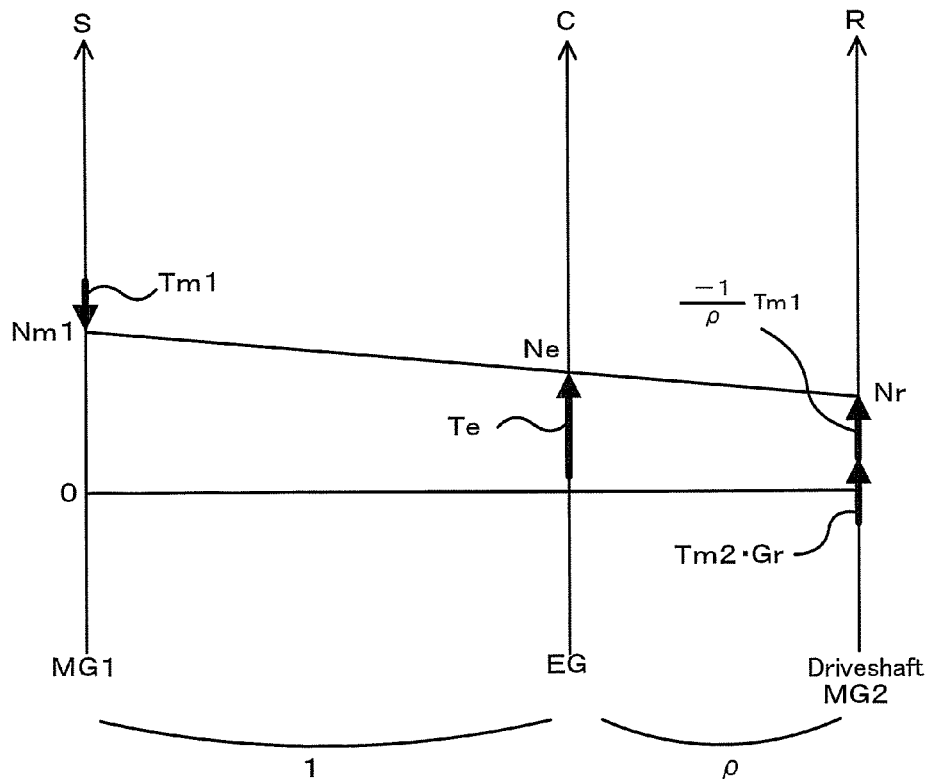
FIG. 9 is an alignment chart showing torque-rotation speed dynamics of respective rotational elements included in a power distribution integration mechanism in the hybrid vehicle of the embodiment, when the vehicle is driven with the power output from the engine 22.

Equation (1) is a dynamic relational expression of the rotational elements included in the power distribution integration mechanism 30. FIG. 9 is an alignment chart showing torque-rotation speed dynamics of the respective rotational elements included in the power distribution integration mechanism 30, when the vehicle is driven with the power output from the engine 22. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 that is obtained by dividing the rotation speed Nm2 of the motor MG2 by a gear ratio Gr of the reduction gear 35. The target rotation speed Nm1* of the motor MG1 in Equation (1) is readily obtainable according to the torque-rotation speed dynamics of this alignment chart. Two upward thick arrows on the axis 'R' respectively show a torque that is transmitted to the ring gear shaft 32a when the torque Tm1 is output from the motor MG1, and a torque that is applied to the ring gear shaft 32a via the reduction gear 35 when the torque Tm2 is output from the motor MG2. Equation (2) is a relational expression of feedback control to drive and rotate the motor MG1 at the target rotation speed Nm1*.

In Equation (2) given above, 'k1' in the second term and 'k2' in the third term on the right side respectively denote a gain of the proportional and a gain of the integral term.

The CPU 72 then calculates a tentative motor torque Tm2tmp to be output from the motor MG2 from the sum of the torque demand Tr* and the quotient of the torque command Tm1* of the motor MG1 and the gear ratio ρ of the power distribution integration mechanism 30 according to Equation (3) given below (step S170):

$$Tm2tmp = (Tr^* + Tm1^*/\rho)/Gr \qquad (3)$$

The CPU 72 respectively calculates a lower torque restriction Tm2min and an upper torque restriction Tm2max as a minimum possible torque and a maximum possible torque output from the motor MG2 according to Equation (4) and Equation (5) given below (step S180):

$$Tm2\min = (Win - Tm1^* \cdot Nm1)/Nm2 \qquad (4)$$

$$Tm2\max = (Wout - Tm1^* \cdot Nm1)/Nm2 \qquad (5)$$

The calculation subtracts the product of the calculated torque command Tm1* and the current rotation speed Nm1 of the motor MG1, which represents the power consumption (power generation) of the motor MG1, from the input and output limits Win and Wout of the battery 50 and divides the differences by the current rotation speed Nm2 of the motor MG2. The CPU 72 sets a torque command Tm2* by limiting the set tentative motor torque Tm2tmp to a torque between the lower torque restriction Tm2min and the upper torque restriction Tm2max according to Equation (6) given below (S190):

$$Tm2^* = \max(\min(Tm2tmp, Tm2\max), Tm2\min) \qquad (6)$$

Equation (3) is readily obtainable according to the alignment chart in FIG. 9.

After setting the target rotation speed Ne* and the target torque Te* of the engine 22, the target rotation speed Nm1* and the torque command Tm1* of the motor MG1, and the torque command Tm2* of the motor MG2, the CPU 72 sends the target rotation speed Ne* and the target torque Te* of the engine 22 to the engine ECU 24 and the target rotation speed Nm1* and the torque commands Tm1* and Tm2* of the motors MG1 and MG2 to the motor ECU 40 (step S200) and exits from this drive control routine. The engine ECU 24 receives the target rotation speed Ne* and the target torque Te* and performs fuel injection control and ignition control to drive the engine 22 at a specified drive point of the target rotation speed Ne* and the target torque Te*. The motor ECU 40 receives the target rotation speed Nm1* and the torque commands Tm1* and Tm2* and performs switching control of the switching elements included in the respective inverters 41 and 42 to drive the motor MG1 with the torque command Tm1* and the motor MG2 with the torque command Tm2*. The torque demand Tr* is output to the ring gear shaft 32a as the driveshaft within a range of the input and output limits Win and Wout. The power demand Pe* of the engine 22 is calculated by subtracting the charge-discharge power demand Pb* of the battery 50 from the product of the torque demand Tr* and a rotation speed Nr of the ring gear shaft 32a, and adding a potential loss. The battery 50 is then charged or discharged with the electric power equivalent to the charge-discharge power demand Pb*.

On condition that the power demand Pe* is lower than the preset reference power Pstop at step S140, the CPU 72 specifies to stop the operation of the engine 22 and sends a control signal to engine ECU 24 to stop fuel injection control and ignition control to stop the operation of the engine 22 (step S210). The CPU 72 sets the torque command Tm1* of the motor MG1 to a value '0' (step S220). The CPU 72 sets the tentative motor torque Tm2tmp by assigning a value '0' to the torque command Tm1* in Equation (3) (step S170), calculates the lower and upper torque restrictions Tm2min and Tm2max by assigning a value '0' to the torque command Tm1* in Equation (4) and Equation (5) (step S180), and sets the torque command Tm2* of the motor MG2 by limiting the tentative motor torque Tm2tmp to the torque between the lower torque restriction Tm2min and the upper torque restriction Tm2max according to Equation (6) (step S190). The CPU 72 sends the torque commands Tm1* and Tm2* of the motors MG1 and MG2 to the motor ECU 40 (step S200) and exits from this drive control routine. The operation of the engine 22 is stopped and the torque demand Tr* is output from the motor MG2 to the ring gear shaft 32a or the driveshaft within a range of the input and output limits Win and Wout of the battery 50.

On condition that the engine 22 is not under operation at step S120, that is, the engine 22 is under stop, the CPU 72 specifies whether the engine 22 is under restart (step S230) and whether the power demand Pe* is higher than or equal to a preset reference power Pstart for restart of the engine 22 (step S240). The preset reference power Pstart can be set to a value proximity to a minimum power level of the power range where the engine 2 is efficiently operated. It is preferred that the preset reference power Pstart is higher than the preset reference power Pstop to prevent the operation of the engine 22 from alternating between stop and restart. On condition that the engine 22 is under stop, the engine 22 is not under restart, and the torque demand Pe* is lower than the preset power Pstart, the CPU 72 specifies to keep the operation of the engine 22 and perform the process at step S220 and S170-S200.

On condition that the engine 22 is under stop at step S120, the engine 22 is not under restart at step S230, and the power demand Pe* is higher than or equal to the preset reference power Pstart, the CPU 72 specifies to restart the engine 22 and sets the torque command Tm1* to a restart torque Tstart for restart of the engine 22 (step S250). The CPU 72 then specifies whether the rotation speed Ne of the engine 22 reaches or exceeds a preset rotation speed Nref to start fuel injection control and ignition control (step S260). Immediately after a restart of the engine 22, the rotation speed of the engine 22 is low and does not reach the preset rotation Nref. For this reason, the CPU 72 specifies a negative conclusion at step S260 and does not perform fuel injection control and ignition control. The CPU 72 then sets the tentative torque Tm2tmp by assigning the restart torque Tstart to the torque command Tm1* in Equation (3) (step S170), calculates the lower and upper torque restrictions Tm2min and Tm2max according to Equation (4) and Equation (5) (step S180), and sets the torque command Tm2* of the motor MG2 by limiting the tentative motor torque Tm2tmp to the torque between the lower torque restriction Tm2min and the upper torque restriction Tm2max according to Equation (6) (step S190). The CPU 72 sends the torque commands Tm1* and Tm2* of the motors MG1 and MG2 to the motor ECU 40 (step S200) and exits from this drive control routine.

After the start of restarting engine 22, the CPU 72 determines that engine 22 is under restart at step S230. The CPU 72 sets the torque demand Tm1* of the motor MG1 to the restart torque Tstart (step S250), waits until the rotation speed Ne of the engine 22 reaches to the preset reference rotation speed Nref for starting fuel injection control and ignition control (step S260), and sends control signals to the engine ECU 24 to start fuel injection control and ignition control (step S270). This control causes the engine 22 to be restarted and the torque demand Tr* to be output to the ring gear shaft 32a or the driveshaft within the input and output limits Win and Wout of the battery 50 for driving the vehicle.

Figure 10:
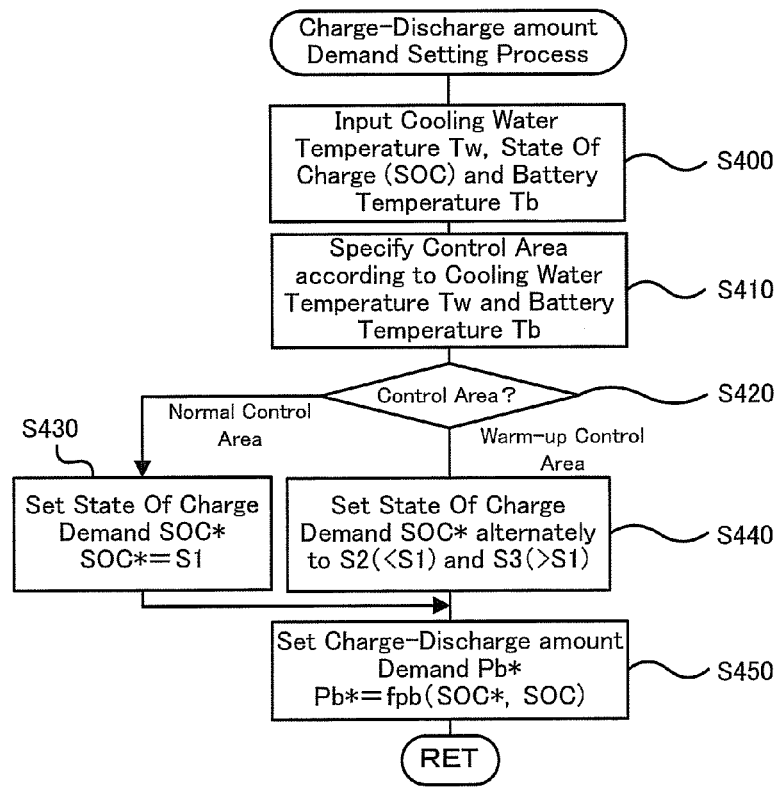
FIG. 10 is a flowchart showing a charge-discharge amount demand setting process executed by the hybrid electronic control unit in one modified example.

The drive control routine is described above. The description regards a setting process of the charge-discharge amount demand Pb* of the battery 50 input at step S100 in the driving control routine. FIG. 10 is a flowchart showing a charge-discharge amount demand setting process executed by the hybrid electronic control unit 70 in one modified example. This process is performed repeatedly at preset time intervals, for example, at every several msec.

Figure 11:
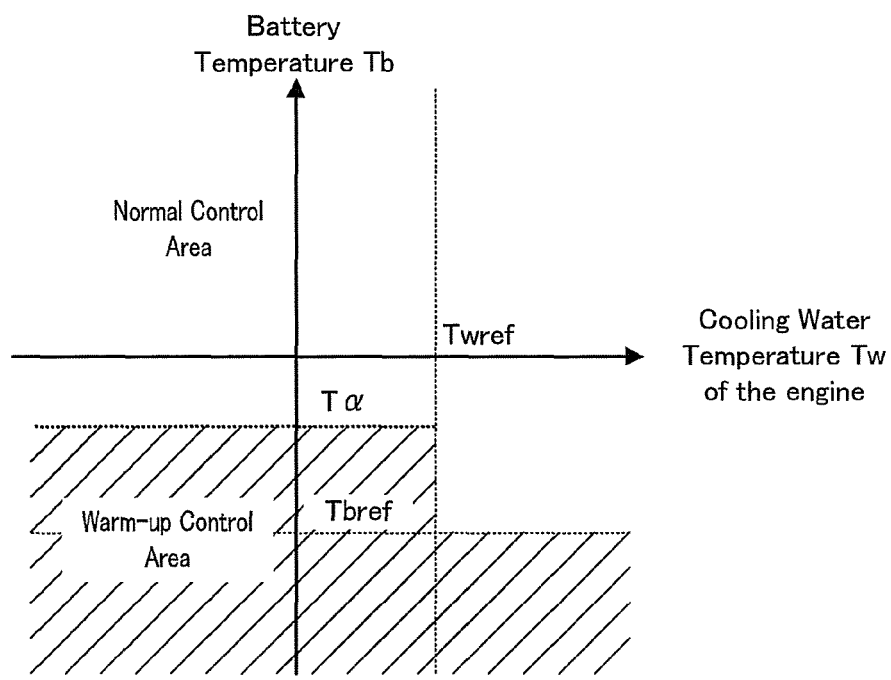
FIG. 11 shows an example of an area specifying map.

In the charge-discharge amount demand setting process, the CPU 72 of the hybrid electronic control unit 70 inputs the cooling water temperature Tw detected by the cooling water temperature sensor 23 and received from the engine ECU 24 by communication, the battery temperature Tb detected by a temperature sensor 51 and received from the battery ECU 52 by communication, and the state of charge SOC calculated by the battery ECU 52 and received by communication (step S400). The CPU 72 specifies whether the input cooling water temperature Tw and the input battery temperature Tb belong to a normal control area or a warm-up control area for warming up the battery 50 (step S410). When the cooling water temperature Tw and the battery temperature Tb belong to the normal control area (step S420), the CPU 72 sets a state of charge demand SOC* to a preset reference state of charge S1 for a normal state, for example 55%, 60%, or 65% (step S430). When the cooling water temperature Tw and the battery temperature Tb belong to the warm-up control area (step S420), the CPU 72 sets the state of charge demand SOC* alternately to a preset reference state of charge S2, for example 45%, 50%, or 55%, which is lower than the preset reference state of charge S1 for the normal state and to a preset reference state of charge S3, for example 60%, 65%, or 70%, which is higher than the preset reference state of charge S1 (step S440). This alternate setting is performed gradually at a preset timing. FIG. 11 shows an example of an area specifying map for specifying the area at step S410. As shown by FIG. 11, the warm-up control area is set as the area where the battery temperature Tb is lower than the preset temperature Tbref, and an area where the battery temperature Tb is higher than or equal to the preset reference temperature Tbref and lower than the preset reference temperature Tα and the cooling water temperature Tw is lower than the preset reference temperature Twref. The normal control area is set as the other areas, that is, the area where the battery temperature Tb is higher than or equal to the preset reference temperature Tbref and the cooling water temperature Tw is higher than or equal to the preset reference temperature Twref, and the area where the battery temperature Tb is higher than or equal to a preset reference temperature Tα and the cooling water temperature Tw is lower than the preset reference temperature Twref. In the intermittent operation permission/non-permission specifying process in FIG. 6 described above, the CPU 72 prohibits the intermittent operation for warm-up of the battery 50 on condition that the battery temperature Tb is lower than the preset reference temperature Tbref, while prohibiting the intermittent operation for warm-up of the engine 22 on condition that the cooling water temperature Tw is lower than the preset reference temperature Twref. When the cooling water temperature Tw is higher than or equal to the preset reference temperature Twref, that is, warm-up of the engine 22 is complete, and the battery temperature Tb is higher than or equal to the preset reference temperature Tbref, that is, warm-up of the battery 50 is complete, the CPU 72 performs the intermittent operation of the engine 22. Thus, this control enhances the energy performance of the vehicle on the whole. Meanwhile, when the cooling water temperature Tw is lower than the preset reference temperature Twref, warm-up of the engine 22 is not complete. Thus, even if the battery temperature Tb is higher than or equal to the preset reference temperature Tbref, the CPU 72 does not perform the intermittent operation. In this case, it is preferable to perform the warm-up control to keep the warm-up control of the battery 50 rather than to perform the normal control for enhancement of the battery performance. Thus, this arrangement enables the range of the input and output limits Win and Wout to be increased (refer to FIG. 2 and FIG. 3) and the driving performance to be enhanced. Additionally, this arrangement enables more driving energy to be charged to the battery 50 as the motor MG2 regenerates during deceleration and energy efficiency of the vehicle to be enhanced on the whole. For this reason, the CPU 72 performs the warm-up control on condition that the battery temperature Tb is lower than the preset reference temperature Tbref, and the CPU 72 also performs the warm-up control on condition that the battery temperature Tb is lower than the preset reference temperature Tα and the cooling water temperature Tw is lower than the preset reference temperature Twref even if the battery temperature Tb is higher than or equal to the preset reference temperature Tbref. In the latter condition, warm-up of the battery 50 is complete but warm-up of the engine 22 is not complete. The CPU 72 thus does not perform the intermittent operation. The preset reference temperature Tα is higher than the preset reference temperature Tbref. The preset reference temperature Tα, which is higher than the preset reference temperature Tbref, is set to a value proximity to a minimum value of the temperature range for charging and discharge the battery 50 appropriately and is set according to an battery specification, for example to −10° C., −5° C., or 0° C.

Figure 12:
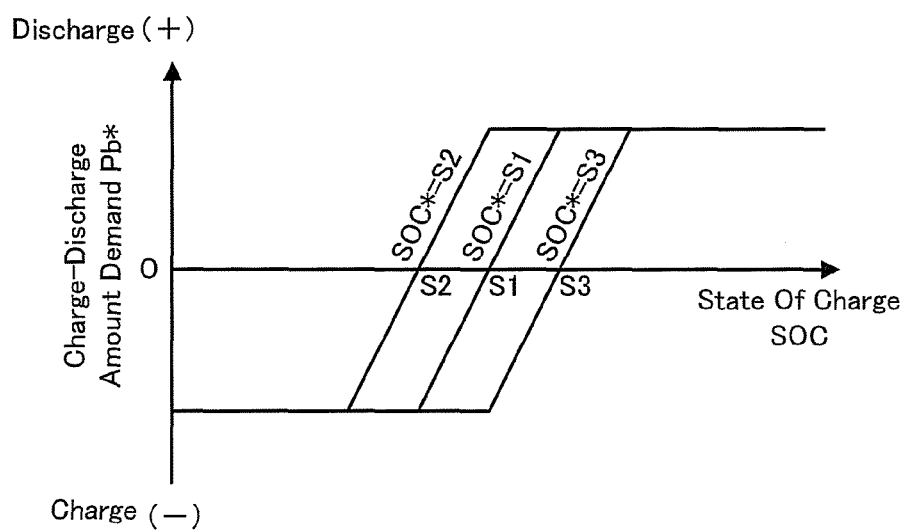
FIG. 12 shows an example of a charge-discharge amount demand setting map.

The CPU 72 then sets the charge-discharge amount demand Pb* based on the set state of charge demand SOC* and the input state of charge SOC (step S450) and exits from this process. A concrete procedure of setting the charge-discharge amount demand Pb* in this embodiment stores in advance variations in charge-discharge amount demand Pb* against the state of charge demand SOC* and the current state of charge SOC as a charge-discharge amount demand setting map in the ROM 74 and reads the charge-discharge amount demand Pb* corresponding to the given state of charge demand SOC* and state of charge SOC from this charge-discharge amount demand setting map. One example of the charge-discharge amount demand setting map is shown in FIG. 12. The power demand Pe* to be output from the engine 22 is set based on the set charge-discharge amount demand Pb* at the drive control routine in FIG. 4, and the engine 22 and the motors MG1 and MG2 is controlled to drive the engine 22 at a specified drive point according to the set the power demand Pe* and to output the torque demand Tr* to the ring gear shaft 32a or the driveshaft. This control causes the vehicle to be driven with a torque equivalent to the torque demand Tr* and the state of charge of the battery 50 to approach the state of charge demand SOC*.

In the hybrid vehicle 20 of the embodiment described above, when the battery temperature Tb is lower than the preset reference temperature Tbref, drive control prohibits the intermittent operation of the engine 22 and controls the engine 22 and the motors MG1 and MG2 to output the torque demand Tr* to the ring gear shaft 32a or the driveshaft with warm-up control of the battery 50. When the battery temperature Tb is higher than or equal to the preset reference temperature Tbref and the cooling water temperature Tw is higher than or equal to the preset reference temperature Twref, drive control performs the intermittent operation of the engine 22 and controls the engine 22 and the motors MG1 and MG2 to output the torque demand Tr* to the ring gear shaft 32a. When the battery temperature Tb is higher than or equal to the preset reference temperature Tbref and the cooling water temperature Tw is lower than the preset reference temperature Twref, drive control prohibits the operation of the engine 22 and controls the engine 22 and the motors MG1 and MG2 to keep the warm-up control of the battery 50 and to output the torque demand Tr* to the ring gear shaft 32a. Thus, when the intermittent operation of the engine 22 is permitted even if warm-up control of the battery 50 is complete, the energy efficiency of the vehicle is enhanced by the intermittent operation. When the intermittent operation of the engine 22 is prohibited, the battery performance is enhanced by continuance of warm-up control of the battery 50. This control enhances the energy performance and the energy efficiency of the vehicle.

The hybrid vehicle 20 of the embodiment sets the state of charge demand SOC* alternately to the low state of charge S2, which is lower than the preset reference state of charge S1 for normal state, and to the high state of charge S3, which is higher than the preset reference state of charge S1, and controls to charge and discharge the battery 50 with the set the state of charge demand SOC*. The state of charge demand SOC* may be set alternately to the preset reference state of charge S1 and the low state of charge S2. Any method will be fine as long as the battery 50 is warmed up by charging and discharging.

The hybrid vehicle 20 of the embodiment specifies permission or non-permission of the intermittent operation of the engine 22 based on the battery temperature Tb and the cooling water temperature Tw at the intermittent operation permission/non-permission specifying process in FIG. 6. In another embodiment, the drive control of the vehicle equipped with a heating system, which warms up a crew compartment by an exhaust heat of the engine 22, may specify prohibition of the intermittent operation of the engine 22, on condition that heating of the compartment is required.

The hybrid vehicle 20 of the embodiment performs the normal control on condition that the battery temperature Tb is higher than or equal to the preset reference temperature Tα and the cooling water temperature Tw is lower than the preset reference temperature Twref. The control may keep the warm-up control in the above condition.

Figure 13:
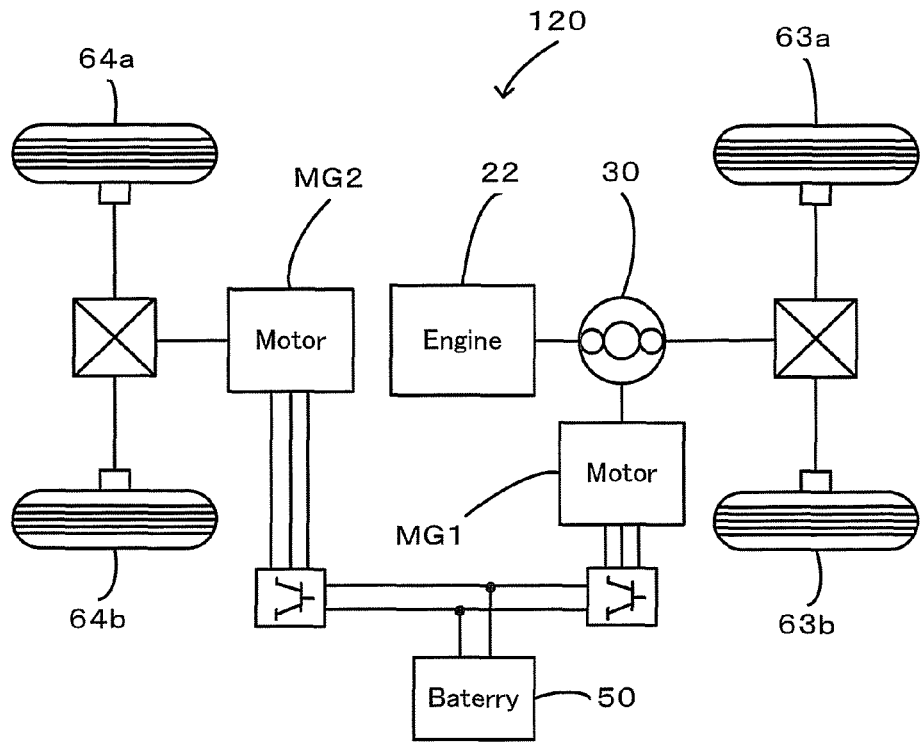
FIG. 13 schematically illustrates the configuration of still another hybrid vehicle 120 as another modified example.

In the hybrid vehicle 20 of the embodiment, the power of the motor MG2 is output to the ring gear shaft 32a or the driveshaft through the transmission by the reduction gear 35. The technique of the invention is, however, not restricted to this configuration but is also applicable to a hybrid vehicle 120 of another modified example shown in FIG. 13. In the hybrid vehicle 120 of this modified configuration, the power of the motor MG2 is output to a axle (an axle linked to wheels 64a and 64b) different from the axle connected with the ring gear shaft 32a (the axle linked to the drive wheels 63a and 63b).

Figure 14:
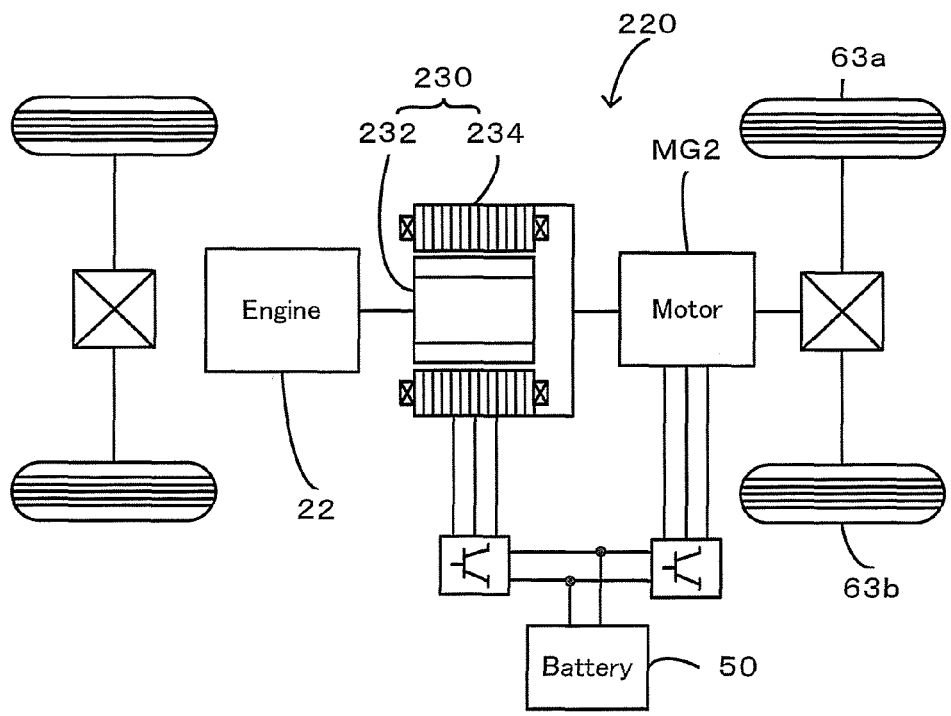
FIG. 14 schematically illustrates the configuration of another hybrid vehicle 220 as still another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 14, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The technique of the invention is not restricted to the hybrid vehicle but is also applicable to a vehicle except the hybrid vehicle or control method of the vehicle.

The primary elements in the embodiment and its modified examples are mapped to the primary constituents as described below. The engine 22 in the embodiment is equivalent to the 'internal combustion engine'. The combination of the power distribution integration mechanism 30 with the motor MG1 in the embodiment corresponds to the 'electric power generating unit'. The motor MG2 in the embodiment is equivalent to the 'motor'. The battery 50 in the embodiment is equivalent to the 'accumulator unit'. The temperature sensor 51 in the embodiment is equivalent to the 'temperature detector'. The hybrid electronic control unit 70 executing the procedure of step S100 in the drive control routine of FIG. 4, that sets the torque demand Tr* based on the accelerator opening Acc and the vehicle speed V, in the embodiment is equivalent to the 'driving force demand setting module'. The combination of the hybrid electronic control unit 70 executing the procedures of the drive control routine of FIG. 4, the intermittent operation permission specifying routine of FIG. 6 and the charge-discharge demand setting process of FIG. 10 with the engine ECU 24 driving and controlling the engine 22 with the target rotation speed Ne* and the target torque Te* and with the motor ECU 40 driving and controlling the motors MG1 and MG2 with the torque command Tm1* and Tm2* in the embodiment is equivalent to the 'controller'. In these routines, when the battery temperature Tb is lower than the preset reference temperature Tbref, drive control prohibits the intermittent operation of the engine 22 and sets the rotation speed command Ne* and the torque command Te* of the engine 22 and the torque commands Tm1* and Tm2* of the motors MG1 and MG2 to perform the warm-up control of the battery 50 and to output the torque demand Tr* to the ring gear shaft 32a or the driveshaft for driving the vehicle within the range of the input and output limits Win and Wout, and sends these control signals to the engine ECU 24 and the motor ECU 40. In these routines, when the battery temperature Tb is higher than or equal to the preset reference temperature Tbref and the cooling water temperature Tw is higher than or equal to the preset reference temperature Twref, drive control performs the intermittent operation of the engine 22 and sets the rotation speed command Ne* and the torque command Te* of the engine 22 and the torque commands Tm1* and Tm2* of the motors MG1 and MG2 to output the torque demand Tr* to the ring gear shaft 32a for driving the vehicle within the range of the input and output limits Win and Wout, and sends these control signals to the engine ECU 24 and the motor ECU 40. In these routines, when the battery temperature Tb is higher than or equal to the preset reference temperature Tbref and the cooling water temperature Tw is lower than the preset reference temperature Twref, drive control prohibits the operation of the engine 22, sets the rotation speed command Ne* and the torque command Te* of the engine 22 and the torque commands Tm1* and Tm2* of the motors MG1 and MG2 to keep the warm-up control of the battery 50 and to output the torque demand Tr* to the ring gear shaft 32a for driving the vehicle, and sends these control signals to the engine ECU 24 and the motor ECU 40. The motor MG1 in the embodiment is equivalent to the 'generator'. The power distribution and integration mechanism 30 in the embodiment is equivalent to the 'three shaft-type power input output module'. The pair-rotor motor 230 in the modified example is also equivalent to 'electric power generating unit'. The "internal combustion engine" is not limited to an internal combustion engine that delivers power by means of a hydrocarbon-based fuel such as gasoline or light oil, and any type of internal combustion engine such as a hydrogen-fueled engine may be used. The "electric power generating unit" is not limited to the combination of the power distribution and integration mechanism 30 and the motor MG1 or the pair-rotor motor 230, and any type of mechanism that generates electric power using at least part of the output power of the internal combustion engine such as a mechanism that is connected to the driveshaft linked to an axle and also connected to the output shaft of the internal combustion engine capable of being rotated independently of the driveshaft and can input and output power to and from the driveshaft and the output shaft through input and output of electric power and mechanical power, may be used. The "motor" is not limited to the motor MG2 configured as a synchronous motor generator, and any type of motor that can input and output electric power, such as an induction motor, may be used. The "accumulator unit" is not limited to the battery as a nickel hydride battery, and any type of accumulator that can give and get electric power to and from the electric power generating unit and the motor, such as another type of battery, for example a lithium-ion battery, or a capacitor, may be used. The "driving force demand setting mechanism" is not limited to the mechanism that sets the torque demand Tr* based on the accelerator opening Acc and the vehicle speed V, and any type of mechanism that sets the driving force demand required for driving the vehicle, such as a mechanism that sets a torque demand based on the accelerator opening Acc only or a mechanism that sets the torque demand based on a running position on the running path in the case where the running path is set in advance, may be used. The "control module" is not limited to the combination of the hybrid electronic control unit 70, the engine ECU 24, and the motor ECU 40, and the control module may be configured by a single electronic control unit. Also, the "control module" is not limited to the following module. When the battery temperature Tb is lower than the preset reference temperature Tbref, the module prohibits the intermittent operation of the engine 22 and controls the engine 22 and the motors MG1 and MG2 to perform the warm-up control of the battery 50 and to output the torque demand Tr* to the ring gear shaft 32a or the driveshaft within the range of the input and output limits of the battery 50. When the battery temperature Tb is higher than or equal to the preset reference temperature Tbref and the cooling water temperature Tw is higher than or equal to the preset reference temperature Twref, the module performs the intermittent operation of the engine 22 and controls the engine 22 and the motors MG1 and MG2 output the torque demand Tr* to the ring gear shaft 32a. When the battery temperature Tb is higher than or equal to the preset reference temperature Tbref and the cooling water temperature Tw is lower than the preset reference temperature Twref, the module prohibits the operation of the engine 22 and controls the engine 22 and the motors MG1 and MG2 to keep the warm-up control of the battery 50 and to output the torque demand Tr* to the ring gear shaft 32a for driving the vehicle within the range of the input and output limits of the battery 50. Any type of module that drives the internal combustion engine and controls the internal combustion engine, the electric power generating unit and the motor to ensure output of a driving force equivalent to the set driving force demand and charge and discharge of the accumulator unit for warming up the accumulator unit upon a satisfaction of a specific condition that the detected temperature of the accumulator unit is lower than a first preset reference temperature, the specific condition being one of conditions for prohibiting the intermittent operation of the internal combustion engine, the module performing the intermittent operation of the internal combustion engine and controlling the internal combustion engine, the electric power generating unit and the motor to ensure output of the driving force equivalent to the set driving force demand on condition that the detected temperature of the accumulator unit is higher than or equal to the first preset reference temperature and the conditions for prohibiting the intermittent operation other than the specific condition are not satisfied, the module continuing the operation of the internal combustion engine and controlling the internal combustion engine, the electric power generating unit and the motor to ensure output of the driving force equivalent to the set driving force demand and charge and discharge of the accumulator unit for warming up the accumulator unit on condition that the detected temperature of the accumulator unit is higher than or equal to the first preset reference temperature and the conditions for prohibiting the intermittent operation other than the specific condition are satisfied, may be used. The "generator" is not limited to the motor MG1 configured as a synchronous motor generator, and any type of motor that can input and output electric power, such as an induction motor, may be used. The "three shaft-type power input output module" is not limited to the aforementioned power distribution and integration mechanism 30, and any type of module that is connected to the three shafts of the drive shaft, the output shaft, and the rotating shaft of generator and inputs and outputs power, based on the power input to and output from any two shafts of the three shafts, to and from the remaining shaft, such as a module using a double pinion-type planetary gear mechanism, a module that is connected to four or more shafts by combining a plurality of planetary gear mechanisms, or a module having working operation different from the planetary gear like a differential gear, may be used. The above mapping of the primary elements in the embodiment and its modified examples to the primary constituents is not restrictive in any sense but is only illustrative for concretely describing the modes of carrying out the invention. Namely the embodiment and its modified examples discussed above are to be considered in all aspects as illustrative and not restrictive.

The embodiment and its modified examples discussed above are to be considered in all aspects as illustrative and not restrictive. There may be many other modifications, changes, and alterations without departing from the scope or spirit of the main characteristics of the present invention.

The disclose of Japanese Patent Application No. 2007-114646 filed Apr. 24, 2007 including specification, drawings and claims is incorporated herein by reference in its entirety.
Industrial Applicability The technique of the invention is preferably applicable to the manufacturing industries of hybrid vehicles.

The invention claimed is:
1. A vehicle, comprising:
an internal combustion engine;
an electric power generating unit that generates electric power with at least part of power from the internal combustion engine;
a motor that inputs and outputs power from and to an axle;
an accumulator unit that inputs and outputs electric power from and to the electric power generating unit and the motor;
a temperature detector that detects the temperature of the accumulator unit;
a driving force demand setting module that sets a driving force demand for driving the vehicle; and
a control module that drives the internal combustion engine and controls the internal combustion engine, the electric power generating unit and the motor to ensure output of a driving force equivalent to the set driving force demand, wherein, upon a satisfaction of a specific condition that the detected temperature of the accumulator unit is less than a first preset reference temperature, the control module controls charge and discharge of the accumulator unit for warming up the accumulator unit, wherein the specific condition is one of conditions for prohibiting an intermittent operation of the internal combustion engine, wherein, when the detected temperature of the accumulator unit is greater than or equal to the first preset reference temperature and when the conditions for prohibiting the intermittent operation of the internal combustion engine other than the specific condition are not satisfied, the control module performs the intermittent operation of the internal combustion engine and controls the internal combustion engine, the electric power generating unit and the motor to ensure output of the driving force equivalent to the set driving force demand, and wherein, when the detected temperature of the accumulator unit is greater than or equal to the first preset reference temperature and when the conditions for prohibiting the intermittent operation of the internal combustion engine other than the specific condition are satisfied, the control module continues the operation of the internal combustion engine and controls the internal combustion engine, the electric power generating unit and the motor to ensure output of the driving force equivalent to the set driving force demand and charge and discharge of the accumulator unit for warming up the accumulator unit.

2. The vehicle in accordance with claim 1, wherein the control module continues the operation of the internal combustion engine and controls the internal combustion engine, the electric power generating unit and the motor to ensure output of the driving force equivalent to the set driving force demand when the detected temperature of the accumulator unit is greater than or equal to a second preset reference temperature, which is higher than the first preset reference temperature, and the conditions for prohibiting the intermittent operation other than the specific condition are satisfied.

3. The vehicle in accordance with claim 1, wherein one of the conditions for prohibiting the intermittent operation other than the specific condition is a condition that a cooling water temperature of the internal combustion engine is lower than a preset water temperature.

4. The vehicle in accordance with claim 1, wherein the control module sets input and output limits of the accumulator unit based on a state of the accumulator unit including the detected temperature of the accumulator unit and controls the internal combustion engine, the electric power generating unit and the motor to ensure output of the driving force equivalent to the set driving force demand within a range of the set input and output limits.

5. The vehicle in accordance with claim 1, wherein said electric power generating unit is an electric power-mechanical power input output mechanism that is connected to the driveshaft linked to the axle and to an output shaft of the internal combustion engine to independently rotate with respect to the driveshaft and outputs at least part of power from the internal combustion engine to the driveshaft through input and output of electric power and mechanical power.

6. The vehicle in accordance with claim 5, wherein the electric power-mechanical power input output mechanism includes a generator that inputs and outputs power, and a three shaft-type power input output assembly that is connected to three shafts, the output shaft of the internal combustion engine, a rotating shaft of the generator, and the driveshaft, the three shaft-type power input output assembly configured to input and output power from and to a residual one shaft based on power input from and output to any two shafts among the three shafts.

7. A control method of a vehicle that includes an internal combustion engine, an electric power generating unit that generates electric power with at least part of power from the internal combustion engine, a motor that inputs and outputs power from and to an axle, and an accumulator unit that inputs and outputs electric power from and to the electric power generating unit and the motor, the control method comprising the steps of:

(a) setting a driving power demand for driving the vehicle; and (b) upon satisfaction of a specific condition that the detected temperature of the accumulator unit is less than a first preset reference temperature, driving the internal combustion engine and controlling, by a control module, the internal combustion engine, the electric power generating unit, and the motor to ensure output of a driving force equivalent to the set driving force demand and charge and discharge of the accumulator unit for warming up the accumulator unit, wherein the specific condition is one of conditions for prohibiting an intermittent operation of the internal combustion engine, wherein, when the detected temperature of the accumulator unit is greater than or equal to the first preset reference temperature and the conditions for prohibiting the intermittent operation of the internal combustion engine other than the specific condition are not satisfied, performing the intermittent operation of the internal combustion engine and controlling the internal combustion engine, the electric power generating unit and the motor to ensure output of the driving force equivalent to the set driving force demand, and wherein, when the detected temperature of the accumulator unit is greater than is greater than or equal to the first preset reference temperature and when the conditions for prohibiting the intermittent operation of the internal combustion engine other than the specific condition are satisfied, continuing the operation of the internal combustion engine and controlling the internal combustion engine, the electric power generating unit, and the motor to ensure output of the driving force equivalent to the set driving force demand and charge and discharge of the accumulator unit for warming up the accumulator unit.

8. The control method of a vehicle in accordance with claim 7, wherein the step (b) continues the operation of the internal combustion engine and controls the internal combustion engine, the electric power generating unit and the motor to ensure output of the driving force equivalent to the set driving force demand when the detected temperature of the accumulator unit is greater than or equal to a second preset reference temperature, which is higher than the first preset reference temperature, and the conditions for prohibiting the intermittent operation other than the specific condition are satisfied.

9. The control method of a vehicle in accordance with claim 7, wherein one of the conditions for prohibiting the intermittent operation other than the specific condition is a condition that a cooling water temperature of the internal combustion engine is lower than a preset water temperature.

10. The control method of a vehicle in accordance with claim 7, wherein the step (b) sets input and output limits of the accumulator unit based on a state of the accumulator unit including the detected temperature of the accumulator unit and controls the internal combustion engine, the electric power generating unit, and the motor to ensure output of the driving force equivalent to the set driving force demand within a range of the set input and output limits.

* * * * *

UNITED STATES PATENT AND TRADEMARK OFFICE
CERTIFICATE OF CORRECTION

Page 1 of 1

PATENT NO. : 8,249,769 B2
APPLICATION NO. : 12/595029
DATED : August 21, 2012
INVENTOR(S) : Itoh et al.

It is certified that error appears in the above-identified patent and that said Letters Patent is hereby corrected as shown below:

In the Specifications:

In the section entitled Best Modes Of Carrying Out The Invention, at column 6, line 28:
Delete "a engine" and insert therefor --an engine--;

at column 14, line 27:
Delete "Ta" and insert therefor --$T\alpha$--;

at column 14, line 31:
Delete "charging and discharge" and insert therefor --charging and discharging--;

at column 15, line 23:
Delete "with the set the state" and insert therefor --with the setting of the state--;

In the Claims:

at column 20, claim 7, line 40:
Delete "is greater than is greater than" and insert therefor --is greater than--.

Signed and Sealed this
Thirteenth Day of August, 2013

Teresa Stanek Rea
*Acting Director of the United States Patent and Trademark Office*